(No Model.)  4 Sheets—Sheet 1.

T. W. NOTTER.
MACHINE FOR BUNDLING LATHS.

No. 320,387. Patented June 16, 1885.

Attest:
F. H. Schott
A. R. Brown.

Inventor:
Thomas W. Notter,
per J. C. Tasker atty.

(No Model.)　　　　　　　　　　　　　　　　4 Sheets—Sheet 2.
T. W. NOTTER.
MACHINE FOR BUNDLING LATHS.

No. 320,387.　　　　　　　　　　　Patented June 16, 1885.

Attest:
F. H. Schott
A. R. Brown

Inventor:
Thomas W. Notter,
by J. C. Tasker atty.

(No Model.)  4 Sheets—Sheet 3.

T. W. NOTTER.
MACHINE FOR BUNDLING LATHS.

No. 320,387. Patented June 16, 1885.

Attest:
H. H. Schott
A. R. Brown.

Inventor:
Thomas W. Notter,
Geo. J. C. Tasker atty.

(No Model.) 4 Sheets—Sheet 4.

T. W. NOTTER.
MACHINE FOR BUNDLING LATHS.

No. 320,387. Patented June 16, 1885.

Attest:
H. C. Schott
A. R. Brown.

Inventor:
Thomas W. Notter,
by J. C. Tasker atty.

UNITED STATES PATENT OFFICE.

THOMAS WALTER NOTTER, OF MUSKEGON, MICHIGAN.

MACHINE FOR BUNDLING LATHS.

SPECIFICATION forming part of Letters Patent No. 320,387, dated June 16, 1885.

Application filed January 3, 1885. (No model.)

*To all whom it may concern:*

Be it known that I, THOMAS WALTER NOTTER, a citizen of the United States, residing at Muskegon, in the county of Muskegon and State of Michigan, have invented certain new and useful Improvements in Machines for Bundling Laths; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for binding laths and similar commodities into bundles by means of wire bands.

My improved machine consists of a suitable frame-work supporting guideways for the wire of which the bands are formed, with mechanism for automatically cutting the wire and feeding the same into the machine beneath the laths, which are laid in concaved saddles or supports and securely clamped near each end by a pair of pivoted jaws, so as to form a cylindrical bundle, around which the wire is passed by pivoted arms provided with spring-fingers, the whole of said mechanism being actuated from a main shaft by intermediate connections.

The invention consists in certain peculiarities in the construction and combination of devices, as hereinafter more fully set forth and claimed.

Figure 1:
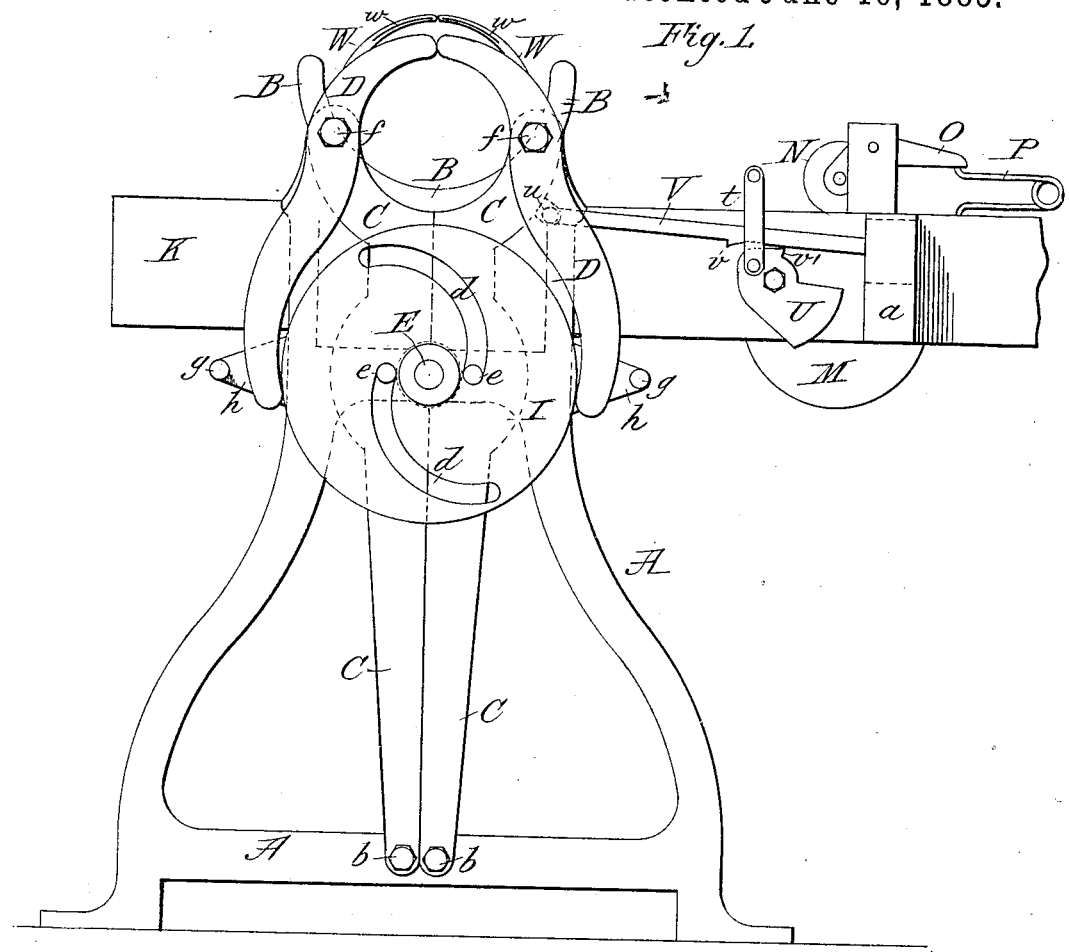
Figure 5:
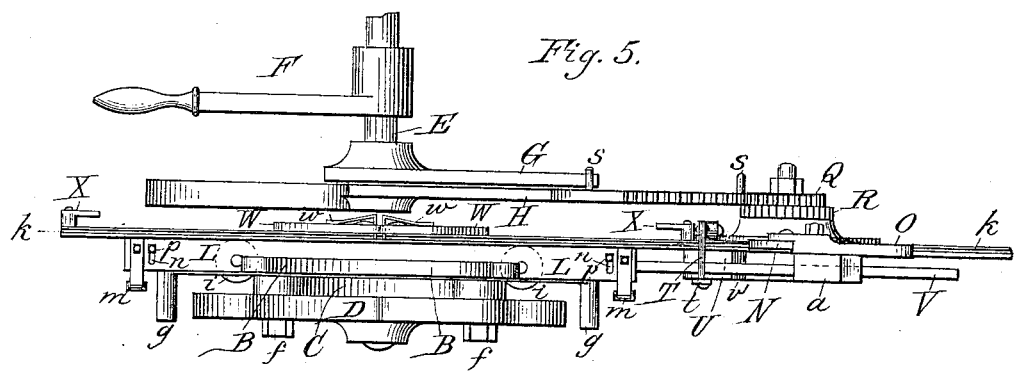
Figure 2:
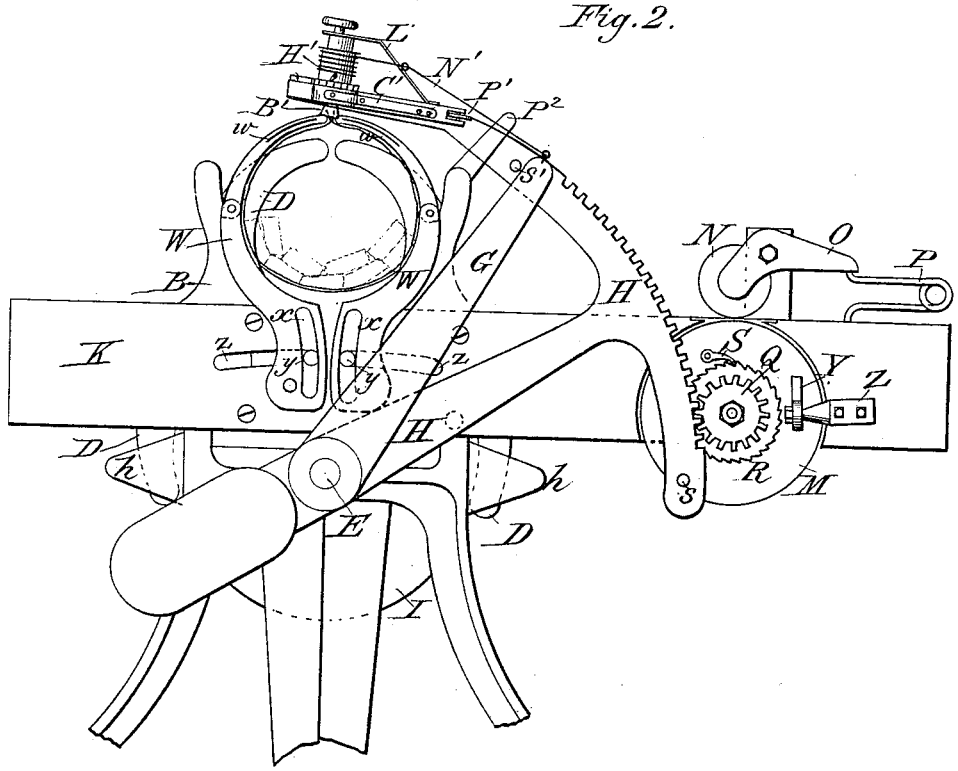
Figure 4:
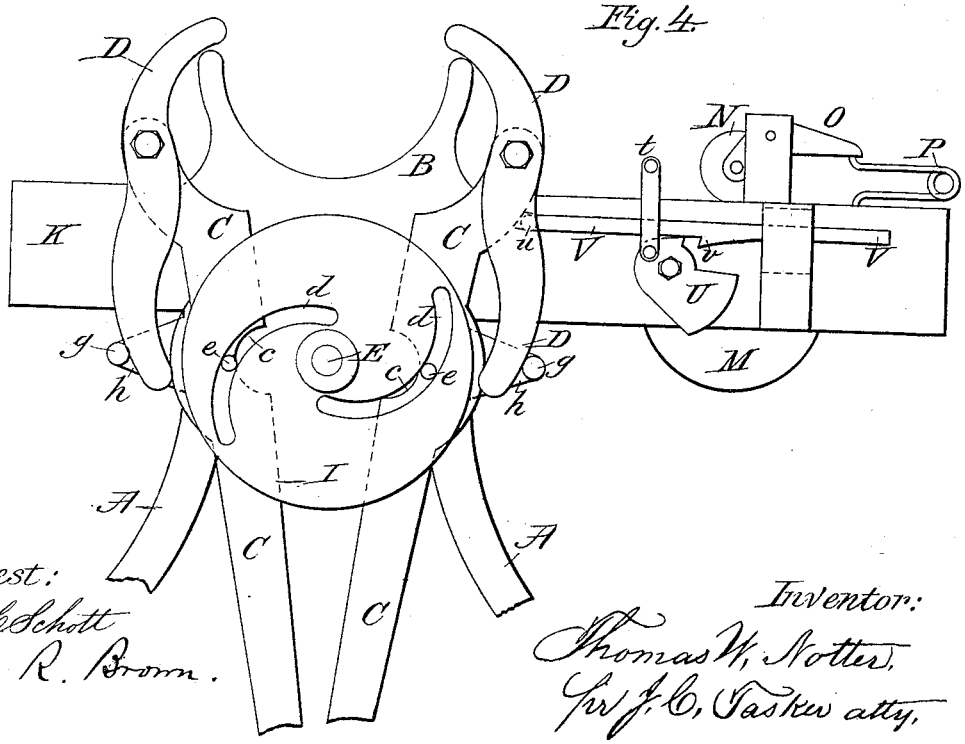
Figure 3:
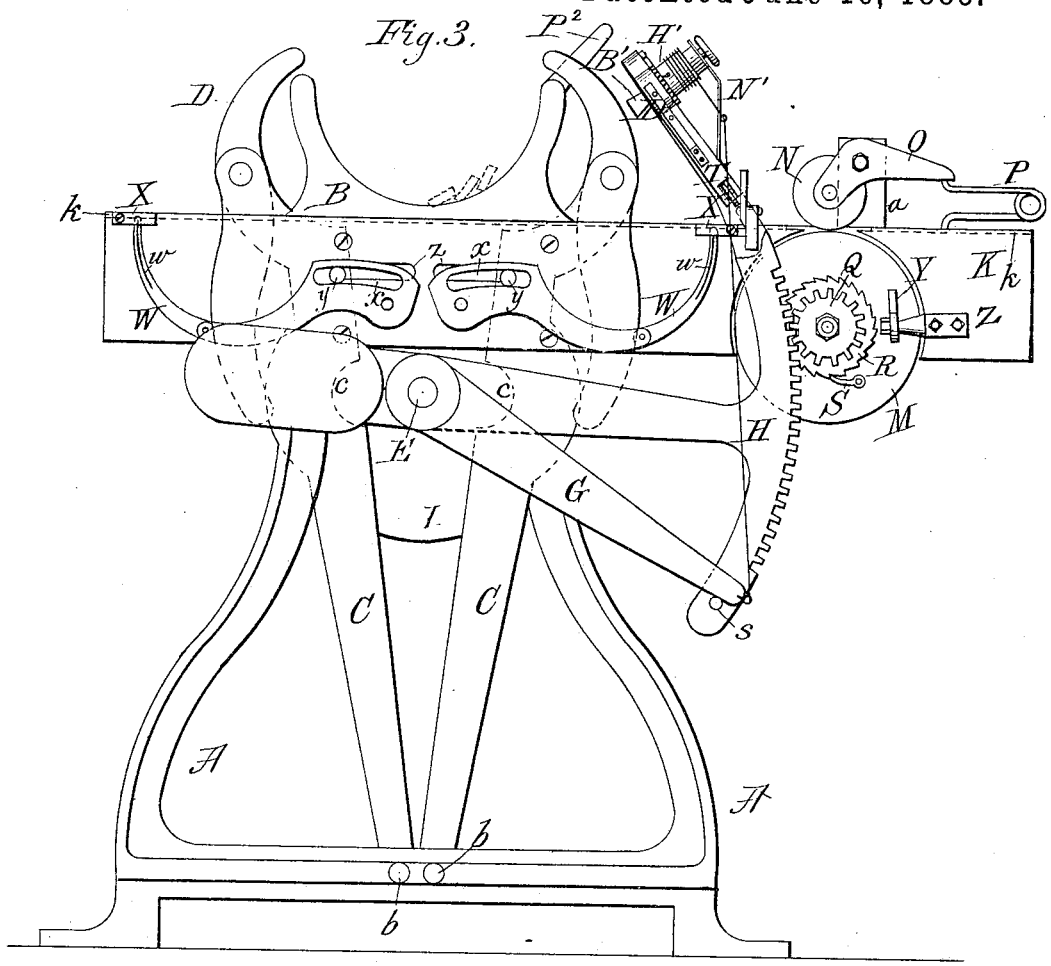
Figure 6:
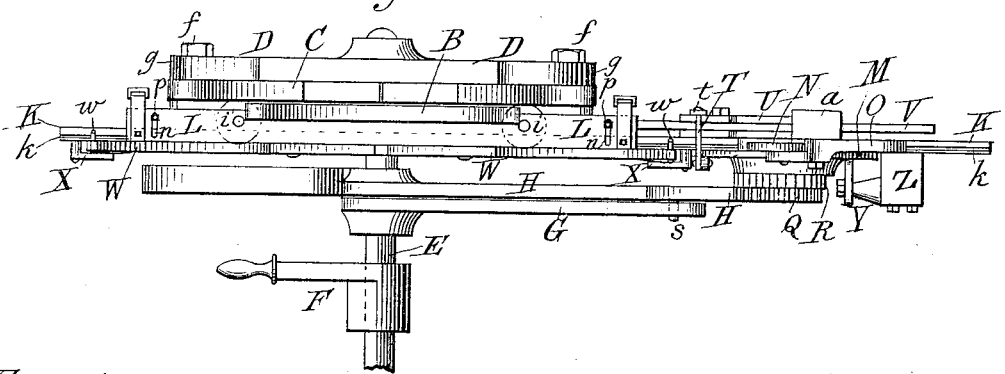
Figure 7:
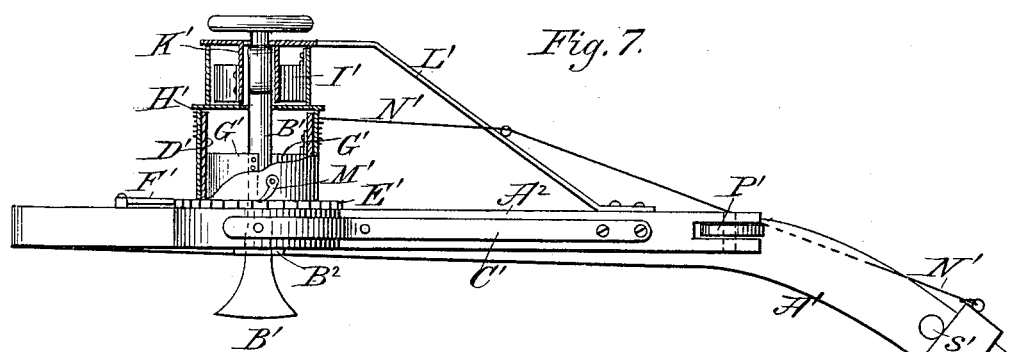
Figure 8:
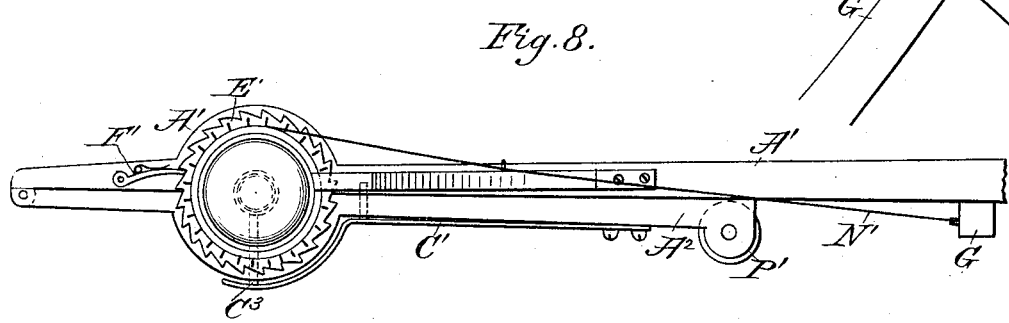
Figure 9:
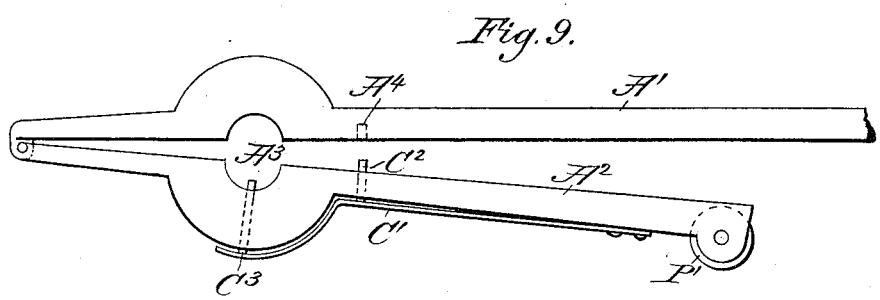
Figure 10:
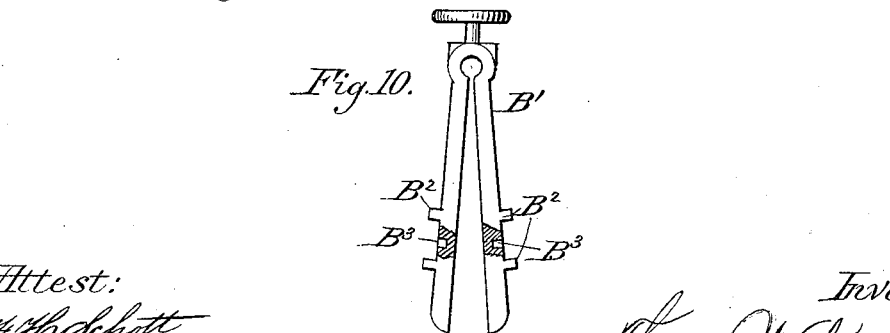

In the annexed drawings, illustrating my invention, Figure 1 is an inside end elevation of my improved machine for bundling and tying laths, the bundling mechanism being shown closed. Fig. 2 is an end elevation of my lath bundling and tying machine, viewed from the outer side of the opposite end. Figs. 3 and 4 are similar views of the machine, showing the lath-bundling mechanism unclosed. Figs. 5 and 6 are partial top views of one end of the machine, showing the lath-bundling mechanism closed and open, respectively. Fig. 7 is a side elevation of the tying mechanism. Fig. 8 is a plan view of the same. Fig. 9 is a plan of the arm that supports the tying mechanism. Fig. 10 is an elevation of the rotary tyer.

Like letters of reference designate like parts in the several views.

The frame of the machine consists of the end standards, A A, which are connected by a girt or girts, $a$, and may be arranged so as to be bolted to the floor. Each standard A is provided at its upper part with a saddle, B, that may be formed integral with the standard, if preferred. These saddles are suitably concaved for the reception and support of the laths to be bundled.

To the lower part of each standard A is pivoted, at $b$ $b$, a pair of clamping-jaws, C C, the upper ends of which are concaved on their inner faces, and provided with vibrating fingers D D, so as to be capable of embracing the laths that rest in the saddles B B and form the same into cylindrical bundles for tying. The clamping-jaws C C are also concaved above their central portions, as shown by dotted lines at $c$ $c$, Figs. 3 and 4, so that when closed they will surround the main shaft E without interference therewith.

On the main shaft E are levers F G, an oscillating segment gear, H, and a slotted wheel, I. The wheel I is provided with cam-slots $d$ $d$, that engage with studs $e$ $e$, formed on or fixed to the clamping-jaws C C, which, together with the vibrating fingers D D, are thus actuated by the rotation of the wheel. The vibrating fingers D D are pivoted near their upper ends, at $ff$, to the upper ends of the clamping-jaws C C, and the lower ends of these vibrating fingers, when opened, rest against studs $g$ $g$ on lugs or projections $h$ $h$ at each side of the standard A, the studs $g$ $g$ thus serving to spread or extend the fingers to their fullest extent as the clamping-jaws are opened.

To the standards A A are secured crosspieces K K, the upper faces of which are grooved longitudinally at $k$ $k$ to form a guideway for the wire with which the bundle of laths is to be bound. The wire is kept in place within the groove $k$ by means of a movable covering-slide, L, in which are journaled a pair of friction-rollers, $i$ $i$, with which the clamping jaws or arms C C come in contact as they are moved up toward the laths in the saddles. The pressure of the clamping arms or jaws C C against the rollers $i$ $i$ thus serves to hold the covering-slide L over the wire in the groove k until said clamping-jaws have moved to their closed position, as shown in Fig. 5, when the slide is moved back toward the saddle B by the force of the springs m m. The slide L is provided at each end with a guide-slot, n, and pin p, by which it is secured to the frame of the machine, so as to be capable of an automatic forward-and-back movement, as described. The wire for forming the bands is fed along the groove k by means of a feed-wheel, M, the periphery of which is provided with a milled groove of such depth as will allow the wire to settle within it one-half its diameter.

Above the grooved feed-wheel M, and in contact therewith, is a pressure-wheel, N, that is journaled in one end of a pivoted bearing, O, the opposite end of which is pressed upward by a spring, P, so as to render the pressure-wheel self-adjusting. The feed-wheel M is actuated from the main shaft E by means of the lever G and oscillating segment-gear H, the latter being arranged to mesh with a pinion, Q, on the same shaft with a ratchet-wheel, R, which engages with a pawl, S, on the feed-wheel. The oscillating segment-gear H is mounted loosely on the shaft E, and is provided at each end with a stud, s or s', against which the lever G alternately bears.

When a proper length of wire to form a band has been fed into the machine, it is necessary to cut it off, and this is accomplished by means of a knife, T, which is connected by links t to a cam, U, that is pivoted to the frame of the machine. The cam U is actuated from one of the clamping jaws or arms C by means of a connecting-bar, V, one end of which is loosely pivoted at u to a lug on said clamping-jaw. The opposite end of the connecting-bar V is unattached, and moves loosely in a slot or mortise formed in the girt a, as shown by dotted lines in Fig. 4. On the under side of this connecting-bar V is a hooked projection, v, which is capable of engaging with a corresponding projection, v', on the upper part of the cam U, thereby imparting a partial rotation to the cam when the clamping-jaws close, and so drawing down the knife T and severing the wire. The severed length of wire is picked up from the guide-groove k and wrapped around the bundle of laths by means of a pair of curved arms, W W, each of which is provided with a curved and laterally-bent spring-finger, w, so formed as to be capable of raising the wire and carrying it around the bundle. The wire-raising arms W W are pivoted to the outer side of the cross-piece K, and are provided at their lower ends with slots x x, for the reception of pins or studs y y on the clamping-jaws C C, the cross-piece K being also slotted at z z for the passage of said pins or studs. The wire-raising arms W W and their fingers w w are thus actuated from the clamping-arms C C by means of the intermediate connections. Attached to the upper edge of the cross piece K, in the path of the wire-raising arms W W, are guides X X, for the spring-fingers w w, which, by coming in contact with said guides, are thus forced inwardly beneath the wire in the guide-groove.

The operation of the machine in bundling the laths and passing the wire bands around the bundle will be apparent. By turning the lever F to its highest point the slotted wheel I will be rotated sufficiently to throw open the clamping-jaws C C to their fullest extent. The vibrating fingers D D, being pivoted to said clamping-jaws, as before described, are also opened at the same time, and their lower ends being thus brought in contact with the fixed studs or stops g g, it is obvious that the free ends of said fingers will be spread to their extreme limits under the continued outward movement of the jaws. The wire-raising arms W W, being pivoted to the fixed cross-piece K, and connected by slots and studs to the jaws C C so as to follow their movements, are also thrown or opened outward at the same time. The bundling mechanism being now in the position shown in Figs. 3 and 6, and ready for use, a quantity of laths, sufficient to form a bundle of proper size, is laid in or upon the saddles B B. The operator now lowers the lever F to about one-half of its throw, which brings the clamping-jaws C C and their vibrating fingers D D up and onto the lath, so as to compress and hold it in a compact cylindrical form. At the same time the wire arms W W and fingers w w are raised, together with the ends of the wire that is to form the bands for tying or securing the bundle. The mechanism is now in the position shown in Figs. 1, 2, and 5. The wire to be used lies in the groove k, Figs. 5 and 6, said groove being also indicated by the dotted line shown in Figs. 2 and 3, and is covered and kept in place within said groove by means of the slide L, acted on by the jaws C C, as before described, until the inward movement of the jaws carries them past the friction-rollers i i, and so releases the slide to the action of the springs m m, thereby uncovering the groove k in season for the upward-advancing arms W W to pick up the wire. This is accomplished by the spring-fingers w w, which are forced inward toward the groove k by the guides X X. The wire, which has been previously cut by the knife T, as before described, is thus carried up and around the bundle of laths by the fingers w w, and may be tied or secured by hand or by any appropriate automatic mechanism, as hereinafter described. Having tied the bundle, the next operation is to release the same and make proper preparation for the binding of the next one. The lever F being at its lowest point, it is now raised, and as this is done the clamping-jaws C C, actuated by the slotted wheel I, and the arms W W, actuated by said jaws, are carried to the open position shown in Figs. 3, 4, and 6. The bound bundle of laths can now be removed, and another quantity of laths being placed on the saddles B B the operation of bundling and binding is repeated as before. After the arms W W and their fingers $w$ $w$ have dropped back to the position shown in Fig. 3, the lever G in its downward movement comes in contact with the stud $s$ at the lower end of the segment-gear H, thereby actuating the same and causing it to communicate motion through the pinion Q, rag-wheel R, and dog or pawl S to the wire-feed wheel M, which, together with the self-adjusting pressure-wheel N, propels the wire along the guide groove $k$, as before mentioned. When the movement of the shaft E and lever G is reversed, the latter, by coming in contact with the stud $s'$ at the upper end of the segment-gear H carries said gear upward. During this reverse movement of the gears H and F the feed-wheel M is prevented from turning backward by a cam-brake Y, on a lug, Z, attached to the frame of the machine, while the teeth of the rag-wheel R slip off from the dog S without exerting any pressure thereon. The upward movement of the segment-gear H is simultaneous with the closing movement of the jaws C C, and one of the latter being in connection with the cam U by the bar V, as before explained, serves to actuate the knife T for cutting off the piece of wire that is to form one of the bands. After the hooked projection $v$ on the under side of the bar V has engaged the corresponding projection, $v'$, on the cam U, and so rotated the same sufficiently to bring the knife T down on the wire, thereby cutting it, the continued movement of the cam brings its long end against the under side of the bar, so as to trip it, thus disengaging the projections $v$ $v'$, and enabling the knife to resume its former position by the gravity of the larger end of the cam.

The automatic mechanism for tying the wire binder consists of an attachment to the segment-gear H, that actuates the wire-feeding mechanism. The upper end of the segment-gear H is provided with an arm, $A'$, to the end of which is hinged a backward-extending lever, $A^2$, as shown in Figs. 8 and 9, the arm $A'$ and lever $A^2$ being formed with oppositely-concaved portions $A^3$, that together constitute a support for the tyer or twister $B'$, Fig. 10. This wire twisting device or tyer $B'$ is formed with two depending spring-arms having shoulders $B^2$ $B^2$, that fit above and below the supporting-arms $A'$ $A^2$. Each arm of the tyer is also provided with a recess or mortise, $B^3$, that alternately receives a pin, $C^3$, on the curved end of a flat spring, $C'$, that is secured to the side of the lever $A^2$, said spring being also provided with a pin, $C^2$, for engaging a mortise, $A^4$, in the segment-arm $A'$. The arms $A'$ $A^2$ support a barrel, $D'$, that surrounds the tyer as shown in Fig. 7. The lower end of this barrel is flanged with a ratchet-rim, $E'$, having horizontal teeth for engaging a spring-pawl, $F'$, on the arm $A'$, as shown in Fig. 8. The tyer $B'$ is connected to the inner side of the barrel $D'$ by a coiled spring, $G'$. The barrel $D'$ is surrounded closely by a cap or outer barrel, $H'$, the upper contracted portion of which is connected by a coiled spring, $I'$, to a tube, $K'$, that is suspended from a bracket, $L'$, attached to the segment-arm, the upper end of the tyer being arranged to pass through said tube. To the outer side of the cap $H'$ is pivoted a pawl, $M'$, for engaging a series of vertical teeth on the ratchet $E'$, that forms the base-flange of the inner barrel, $D'$, the cap $H'$ being arranged to rest on said ratchet or flange. On the cap or outer barrel, $H'$, is wound a cord or wire, $N'$, which is passed through a guide-ring on the bracket $L'$, and secured at its other end to the lever G, that actuates the segment-gear H, as hereinbefore described.

The operation of this tying mechanism is as follows: When the lever F on the main shaft E is thrown down in bundling the lath, the segment-gear H, with its arm $A'$, rises, as before described, the arm $A'$, with the attached tying mechanism, being thus carried over the bundled lath that is supported in the machine-saddle, as shown in Fig. 2. The upward and forward movement of the segment-arm $A'$ and attached lever $A^2$ causes a friction-roller, $P'$, carried by said lever, to come in contact with a projection, $P^2$, Figs. 2 and 3, on the saddle frame. The lever $A^2$ is thus pressed against the side of the arm $A'$ with the pin $C^2$ in the mortise $A^4$, thereby pressing the flat spring $C'$ outward, and disengaging the pin $C^3$ from one of the mortises $B^3$ in the tyer, which is consequently revolved by the tension of the coiled spring $G'$, the barrel to which the other end of the spring $G'$ is attached, being fixed by the engagement of the ratchet $E'$ and pawl $F'$. When the tying mechanism is carried over the bundled lath by the upward movement of the segment H, the expanded lower ends of the spring-arms composing the tyer $B'$ are brought one on each side of the wire band carried by the fingers $w$ $w$. It will thus be seen that as the lever $A^2$ is brought in close contact with the arm $A'$, thereby closing the tyer $B'$, the expanded ends of its spring-arms will firmly grasp and hold the ends of the wire projecting from the fingers $w$ $w$, while the rotation of the tyer, under the recoil of the spring $G'$, will twist together the ends of the wire, and so secure the bundle. The descent of the lever G, by drawing on the cord $N'$, rotates the cap or outer barrel $H'$, and this, by the engagement of its pawl $M'$ with the surface ratchet or vertical teeth of the ratchet-flange $E'$, rotates the inner barrel, $D'$, the springs $G'$ and $I'$ being thus wound. When the springs are wound, the pin $C^3$ and the pawl $F'$ and ratchet $E'$ prevent recoil of the spring $G'$ until it is again time to revolve the tyer. Previous to this, and as the upward movement of the lever G slacks the cord $N'$, said cord is gradually wound by the recoil of the spring $I'$, so as to be in readiness for future operation.

Having thus described my invention, what

I claim as new, and desire to secure by Letters Patent, is—

1. In a machine for bundling laths, the combination of the frame A, having saddles B B, the shaft E, the cam-slotted wheels I, mounted on said shaft, and the pivoted clamping-jaws C C, having vibrating fingers D D, and provided with studs $e\ e$, for engaging the cam-slots in the wheels I, substantially as described.

2. The combination of the frame A provided with cross-pieces K, having guideways $k$ formed therein, the shaft E, the lever G, and the segment-gear H, mounted on said shaft, said gear being provided with studs $s\ s'$, the pinion Q, meshing with the segment-gear, the rag-wheel R, feed-wheel M, provided with pawl S, and the adjustable pressure-wheel N, substantially as described.

3. The combination of the frame A, pivoted jaws C C, having studs $e\ e$, the wheels I, mounted on a shaft, E, and having cam-slots $d\ d$, for engaging the studs $e\ e$, the weighted cam U, pivoted to the cross-piece K, and having a hooked projection, $v'$, the knife T, connected to said cam by links $t\ t$, and the connecting-bar V, pivoted to one of the jaws C, and provided with a hooked projection, $v$, for engaging the cam, substantially as described.

4. The combination of the frame A having cross-pieces K, provided with guideways $k$, guides X X, and slots $z\ z$, the pivoted wire-raising arms W W, having slots $x\ x$ and spring-fingers $w\ w$, and the pivoted clamping-jaws C C, having studs $y\ y$, for engaging the slots $z\ x$, substantially as described.

5. The combination of the frame A, having cross-pieces K, provided with guideways $k$ and guides X X, the pivoted arms W W, having spring-fingers $w\ w$, the feed wheel M, journaled above the guide-way $k$, and having its periphery provided with a milled groove, the pivoted bearing O, the pressure-wheel N, journaled in said bearing, and the spring P, for holding the wheels M and N in contact, substantially as described.

6. The combination of the frame A, having cross-pieces K, provided with guides X X, slots $z\ z$, and guideways $k$, the pivoted clamping-jaws C C, having studs $y\ y$, the pivoted arms W W, having slots $x\ x$ and spring-fingers $w\ w$, and the laterally-movable slide L, arranged above and adapted to cover and uncover the guideway $k$, said slide being provided with rollers $i\ i$, guide-slots $u\ u$, pins $p\ p$, and springs $m\ m$, substantially as described.

7. The combination, with the frame A, having saddles B, pivoted clamping-jaws C C, pivoted wire-raising arms W W, and a shaft, E, carrying a lever, G, and segment-gear H, for actuating a wire-feed mechanism, of a lever, $A^2$, pivoted to an arm, $A'$, of said segment-gear, the spring $C'$, attached to said lever, and having pins $C^2\ C^3$, the rotary tyer $B'$, supported by the arm $A'$ and lever $A^2$, and having concentric barrels $D'\ H'$, springs $G'\ I'$, ratchet $E'$, pawls $F'\ M'$, and a cord, $N'$, attached to the outer barrel, $H'$, and lever G, substantially as described.

In testimony whereof I affix my signature in presence of two witnesses.

THOMAS WALTER NOTTER.

Witnesses:
 DANIEL J. MORIARTY,
 HENRY J. FOOTLANDER.